Dec. 24, 1957 J. D. GILES ET AL 2,817,451

CLOSURE FOR CONTAINERS AND THE LIKE

Filed Aug. 15, 1955 2 Sheets-Sheet 1

INVENTORS
Jeremiah D. Giles
Edwin W. Lynn

BY Eyre, Mann & Burrows
ATTORNEYS

CLOSURE FOR CONTAINERS AND THE LIKE

Filed Aug. 15, 1955 2 Sheets-Sheet 2

INVENTORS
Jeremiah D. Giles
Edwin W. Lynn
BY Eyre, Mann & Burrows
ATTORNEYS

United States Patent Office 2,817,451

Patented Dec. 24, 1957

2,817,451

CLOSURE FOR CONTAINERS AND THE LIKE

Jeremiah D. Giles, Litchfield, Conn., and Edwin W. Lynn, Irvington, N. J., assignors to Celluplastic Corporation, a corporation of New Jersey Application August 15, 1955, Serial No. 528,285

15 Claims. (Cl. 215—7)

The present invention relates to a novel closure for vial or similar article wherein the novel and characterizing feature of the closure involves a time recording device built right into the top of the closure. The time recording device keeps a record of the hour of the day at which it is set and this makes our closure particularly useful for vials for medicaments which have to be taken in successive doses at predetermined periods of time.

In carrying out our invention a disk is rotatively mounted on top of the closure and a series of numerals from 1 to 12 are evenly spaced in a circle around the disk. The disk has an indicator on top for keeping a record of the time, and special means are employed for rotatively mounting the disk on top of the closure. The special mounting means facilitate rotation of the disk by hand and at the same time provide enough frictional drag so that the disk will not be accidentally rotated away from the hour at which it is set. The special mounting means are particularly effective, and in another form of our invention the special mounting means are employed for rotatively mounting a disk on top of a closure adapted for dispensing condiments and the like.

Our invention is best understood by reference to the accompanying drawings in which—

Fig. 1 is a front elevational view of the closure of our invention;

Fig. 2 is a top view thereof;

Fig. 3 is a sectional view taken on line 3—3 of Fig. 2;

Fig. 4 illustrates the structure of the closure of Fig. 1 used in connection with a screw type cap;

Fig. 5 illustrates another form of the structure of our invention used in connection with a dispenser for condiments and the like;

Fig. 6 is a sectional view taken on line 6—6 of Fig. 5;

Fig. 7 illustrates the way in which the annular flange of the closure of Fig. 6 is tensioned against the side wall of the container for which it is intended to tightly seal such container;

Figures 1, 2, 3, 4, 5, 6, 7:
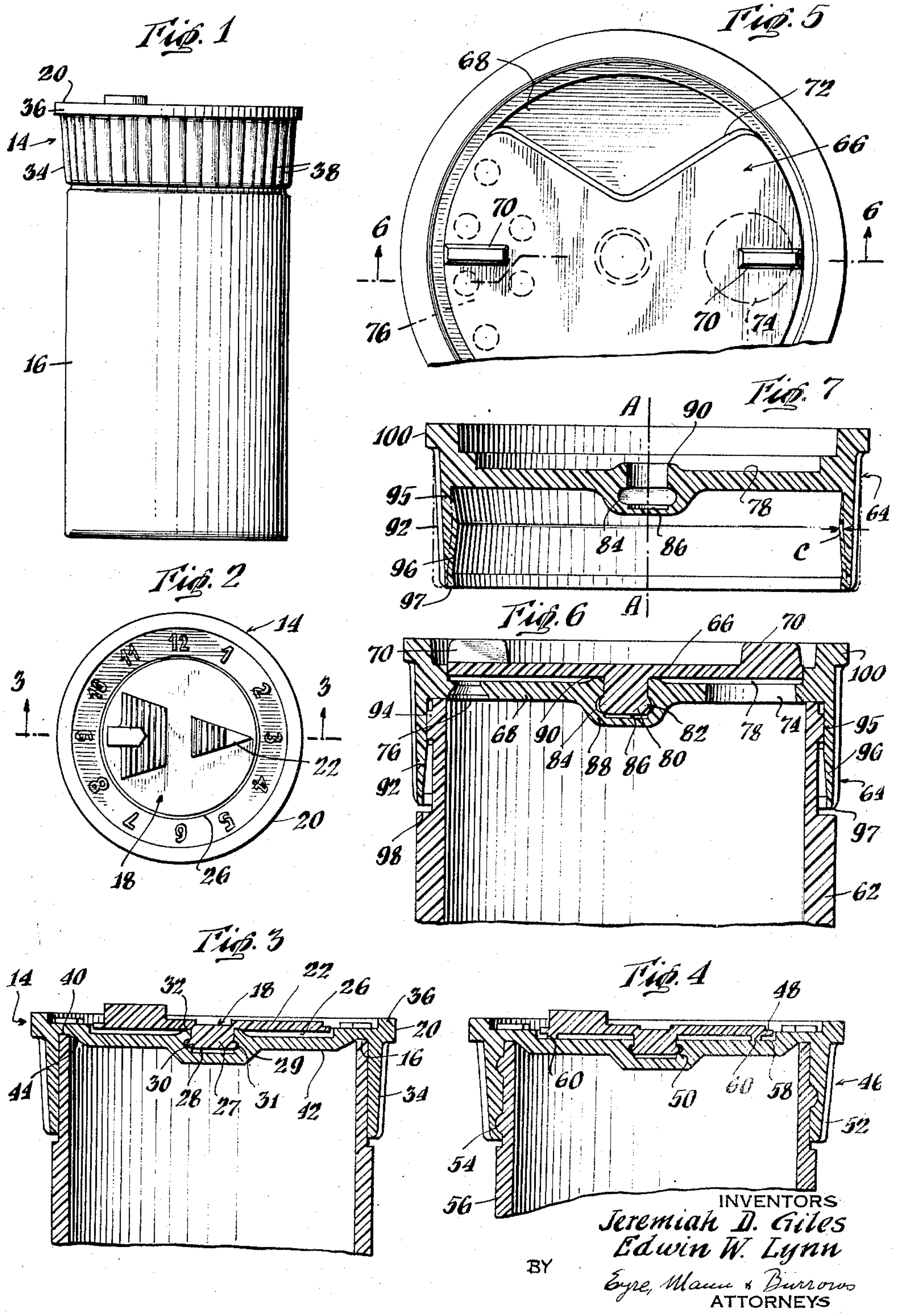

Referring to Figs. 1, 2 and 3 of the drawings, 14 is the closure of our invention as it appears in position covering the mouth of a vial 16 or similar article. Closure 14 includes a disk 18 that as rotatively mounted on the top cover member 20 of closure 14. The diameter of disk 18 is smaller than the diameter of cover member 20 and the disk carries an indicator 22 for recording the time. Indicator 22 may be in the form of an arrow as shown in the drawings which is made to project up above the level of the surface of the disk. As a result, the indicator, in this case the tip of the arrow and its stem, provides gripping means at opposite points across, the circumference of the disk so that the disk may be readily turned to the desired setting. Disk 18 is surrounded with numerals from 1 to 12 that are positioned on top cover member 20 and the numerals are evenly spaced in a circle around the disk. In use, disk 18 is turned by hand until the tip of the indicator arrow is in line with the desired time setting and the indicator in cooperation with the numerals maintains a record of such time until the disk is again turned by hand.

Our closure is particularly adapted for use with vials for medicaments which are ordinarily carried in the pocket and it is therefore important to provide means for preventing the disk from being accidentally rotated away from the hour at which it is set. We guard against this in the structure of our invention by providing a special mounting means for the disk which facilitates rotation of the disk by hand and which at the same time provides enough frictional drag on the disk so that it will not be accidentally rotated away from the hour at which it is set. The special means are most clearly shown in Figs. 3 and 4, and as there shown the mounting means include a circular depression 26 positioned in the top surface of cover member 20. The circumference of depression 26 is made slightly larger than the circumference of disk 18 and the depth of the depression is such that the top surface of the disk will be held approximately flush with the top surface of cover member 20. Disk 18 is free to rotate in depression 26 without binding against the wall thereof and since the clearance between the wall of depression 26 and the periphery of disk 18 is small the side edge of the disk is protected by the wall of the depression so that the disk will not be accidentally hit and rotated away from the hour at which it is set.

Disk 18 is rotatively mounted in depression 26 by means of a stub shaft 27 which is in turn rotatively mounted in a socket 28 positioned in a boss 29 which is in turn positioned in the center of cover member 20. Stub shaft 27 carries an annular ring 30 which projects out from the surface of the shaft and fits into an annular groove 31 positioned in boss 29. Shaft 27 makes a snug frictional fit in socket 28 and the annular ring 30 makes a so-called snap-in fit with groove 31 to lock the shaft in position in socket 28. In the preferred form of our invention shown, the inside diameter of socket 28 is made slightly smaller than the outside diameter of stub shaft 27 so that the wall of socket 28 exerts bearing pressure against the stub shaft. In order to snap annular ring 30 into groove 31, it is necessary to make one of the members of resilient material so that the resilient member will distort enough to allow the ring to enter the groove and thereafter snap back into place to lock the ring in position in the groove.

Best results have been achieved by making the entire closure of plastic material. For the form of our invention shown in Fig. 1, we prefer to use a plastic material for cover member 20 and boss 29 that has a greater resiliency than the plastic material selected for disk 18, stub shaft 27 and ring 30. For example, cover member 20 and boss 29 may be made of polyethylene, vinyls and like resilient plastic materials, and disk 18 and its stub shaft and ring are then made of a plastic material that has greater rigidity, such as styrene or the like. There is an added advantage in making disk 18 of a stiff and rigid plastic material for when this is done, the disk tends to keep its shape and there is no tendency for it to be deformed or bent in use to such an extent as to make it inoperative for its intended purpose.

Referring now to disk 18, we have found that when the bottom surface of disk 18 is perfectly smooth and the surface at the bottom of depression 26 is also perfectly smooth, then there is so much friction generated between these two surfaces that it is exceedingly difficult to rotate the disk into the desired position for indicating time. We solved this problem of friction by separating a substantial portion of the bottom surface of disk 18 from the surface at the bottom of depression 26 and for best results we prefer to separate these two surfaces so that a major portion of the bottom surface of disk 18 is separated from the bottom of depression 26. This is preferably done by means of a bearing surface which as shown in Fig. 3 may be in the form of an annular bearing surface 32 that projects up above the level of the surface of circular depression 26 adjacent the periphery of socket 28 so that a major portion of the bottom surface of the disk is separated from the bottom of circular depression 26. Annular bearing surface 32 so reduces frictional resistance to rotation between disk 18 and the surface of circular depression 26 that the disk may be readily turned by the gripping means provided on the top thereof. At the same time we have found that when stub shaft 27 is snugly fitted in socket 28 (as previously described hereinabove) there is enough static friction between the disk and cover member to hold the disk in a set position and there is no tendency for it to jiggle out of place when closure 14 is removed from the vial or when the closed vial is carried in the pocket with other items such as keys and the like. In the drawings, bearing surface 32 is positioned in the surface of circular depression 26, but it may be positioned on the bottom of the disk with the same result (see Fig. 4). Preferably the thickness of disk 18 and the height of bearing surface 32 is such that the top surface of disk 18 is approximately flush with the surface of cover member 20 when the annular bearing surface is resting against the surface at the bottom of the disk.

Referring again to top cover member 20, it will be seen that the cover member terminates in an annular flange 34 which is positioned around the periphery thereof. Annular flange 34 projects down below cover member 20 and the inside diameter of the annular flange is such that it makes a snug frictional fit with the exterior surface around the mouth of the vial for which the closure is intended. A bead 36 is positioned at the junction between the cover member and flange and the bead projects out beyond the exterior surface of flange 34 to form a grip for lifting closure 14 from the mouth of the vial. If desired, ribs 38 may be positioned on the exterior surface of flange 34 to help turn the closure as it is lifted from the vial. Another feature of cover member 20 is that an annular groove 40 is formed in the bottom surface of cover member 20 which is adapted to receive the rim of vial 16 as shown in Fig. 3. As there shown, the interior wall of flange 34 forms the outer side wall of groove 40 and the inner side wall of the groove is formed by means of a circular plug 42 positioned on the bottom of cover member 20. The diameter of plug 42 is such that the width of groove 40 is approximately equal to the thickness of the wall of vial 16 and as a result both flange 34 and the wall of plug 42 are in contact with the wall of vial 16. In the form of our invention shown, the wall of plug 42 is a beveled edge 44 which assists in orienting the rim of vial 16 in groove 40. Since plug 42 and flange 34 are respectively in contact with the inside and outside wall of vial 16, the vial is tightly closed, making it difficult for dust and dirt and moisture to get into the vial, which is of great advantage in those cases where the vial is used for medicaments.

A modified form of our invention is shown in Fig. 4. As there shown, the construction of closure 46 and the construction of disk 48 and its mounting means indicated at 50 are identical with that disclosed in Fig. 1, with two exceptions. One exception is that the interior of flange 52 of closure 46 is provided with screw threads 54 so that the closure may be tightly screwed down over the mouth of a screw top vial 56. The second exception is that the bearing surface for reducing friction between the surface of disk 48 and the surface in the bottom of the circular depression 58 is positioned on the bottom of disk 48 adjacent the periphery thereof. In this form of our invention, the bearing surface is in the form of an annular track or rail 60, upon which disk 48 rides, and as in the form of our invention illustrated in Fig. 3, the thickness of disk 48 and the height of bearing surface 60 is such that the top surface of the disk is approximately flush with the top surface of closure 46. Materials used in the construction of closure 46 and disk 48 are the same as those used in the construction of the form of our invention shown in Fig. 1, and in addition closure 46 is preferably made of a plastic material that is softer than the material of the vial for which it is intended. When this is done the rim of the vial tends to bite into the plastic material of the closure, giving a very tight seal when the cap is screwed down over the mouth of the vial. For example, we have achieved excellent results by making the closure member of polyethylene plastic materials for vials made of polystyrene or glass.

The timing device of the closure of our invention is of particular advantage with screw type closure members since the closure may be readily unscrewed and removed from the mouth of the vial without danger of accidentally changing the time setting of the disk which is nested in the depression at the top of the closure where it is protected from being accidentally turned when the screw tap is removed.

Another form of our invention which is especially adapted for use as a dispenser for condiments and the like is illustrated in Figs. 5 and 6. In this form of our invention me employ the same special mounting means for rotatively mounting a disk on the top of the closure for a vial or similar container as previously described for the structures shown in Figs. 1 through 4. As previously described, the special mounting means include a so-called snap-in locking device for securely mounting the disk in place on top of the closure, and the mounting means employed so control frictional drag between the disk and closure that the disk may be readily turned and set in the desired position without danger of the disk being accidentally rotated away from the position at which it is set.

Referring to Figs. 5 and 6, our improved dispenser includes a vial 62 and a closure 64 that fits tightly over the open mouth of the vial. Closure 64 includes a disk 66 rotatively mounted on top cover member 68 of closure 64 and the diameter of the disk is smaller than the diameter of the top cover member. Disk 66 has a pair of protuberances 70 that are positioned opposite each other adjacent the periphery of the disk and these project up from the surface of the disk to provide means for rotating the disk into the desired position.

A V-shaped slot 72 is positioned in disk 66 preferably between the protuberances 70 with the open end of the V positioned at the circumference of the disk and with the point of the V positioned on a radial line pointing toward the center of the disk. The top cover member 68 includes an opening which may be a circular opening 74 and a perforated section 76, each of which cooperate with the V-shaped slot 72 for dispensing condiments and the like. In use, disk 66 is turned by hand to bring the V-shaped slot 72 into position over circular opening 74 or perforated section 76 for dispensing condiments and the dispenser may of course be closed by rotating the V-shaped slot into position over the solid portion of top cover member 68.

The special mounting means for the disk includes a circular depression 78 positioned in the top surface of cover member 68. The circumference of depression 78 is made slightly larger than the circumference of the disk and the depth of the depression is such that the top surface of the disk will be held approximately flush with the top surface of cover member 68, all as shown in the drawings. Disk 66 is free to rotate in depression 78 without binding against the wall thereof, and since the clearance between the wall of depression 78 and the periphery of disk 66 is small the side edge of the disk is protected by the wall of the depression which guards against acidentally hitting the disk and rotating it away from the position at which it is set.

As in the case of the form of our invention shown in Fig. 6, disk 66 is rotatively locked in place in cover member 68 by means of a stub shaft 80 that carries an annular ring 82 which in turn makes a snap-in fit with an annular groove 84 positioned in a socket 86 of boss 88. In the preferred form of our invention shown, the diameter of socket 86 is made slightly smaller than the outside diameter of the surface of the wall of stub shaft 80 so that the wall of the socket exerts bearing pressure against the wall of the stub shaft. Frictional drag between the disk and surface of the bottom of circular depression 78 is controlled by means of an annular bearing surface 90 that projects up above the level of the surface of circular depression 78 adjacent the periphery of socket 86 so that a major portion of the bottom surface of the disk is separated from the bottom of circular depression 78. As a result, bearing surface 90 so reduces frictional resistance to rotation between disk 66 and the surface of circular depression 78 that the disk may be readily turned by the protuberances provided on the top thereof and at the same time frictional drag between stub shaft 80 and socket 86 is enough to hold the disk in a set position and there is no tendency for it to jiggle out of place when the assembly is used for dispensing condiments.

As in the case of the form of our invention shown in Fig. 3, in order to snap annular ring 82 into groove 84 it is necessary to make one of the members of resilient material and we have achieved best results by making the entire closure of plastic material. In this connection we prefer to make disk 66 and stub shaft 80 out of rigid material and boss 88 out of a resilient material. When this is done the disk tends to keep its shape and there is no tendency for it to be deformed or bent in use which would make the disk inoperative for our purpose. For example, cover member 68 and boss 88 may be made of polyethylene, vinyls and like resilient plastic materials, and disk 66, stub shaft 80 and ring 82 are then made of a plastic material that has greater rigidity, such as styrene or the like.

Referring again to top cover member 68, it will be seen that the cover member terminates in an annular flange 92 that projects down below the cover member where it makes a tight frictional fit with the exterior surface of the side wall of vial 62. For dispensing condiments it is highly important to exclude moisture from the container, and for this purpose we have devised particularly effective sealing means for closing vial 62. The special sealing means include an annular ring 94 positioned around the exterior surface of the vial just below the rim at the open mouth thereof which cooperates with flange 92 to cam the flange outwardly so that the flange is at all times tensioned against the annular ring for sealing the vial.

As best shown in Fig. 6, ring 94 projects out from the surface of the side wall of the vial and its cross-section is preferably in the form of a rectangle. This gives annular ring 94 sharp side edges that tend to dig into flange 92, and as a result, we achieve a seal that is highly resistant to moisture. In order to make the seal highly effective, the construction of flange 92 is such that the flange is tilted slightly inwardly towards the vertical axis A—A of closure 64 so that line A—A of the vertical axis of closure 64 would if extended intersect a projection of the exterior surface of flange 92 at an acute angle. The inside surface of flange 92 is divided into two sections. A top section 95 is positioned parallel to the exterior surface of flange 92 and the diameter of section 95 is slightly smaller than the outside diameter of the annular sealing ring 94 of vial 56. The difference in the outside diameter of annular ring 94 and the inside section 95 is such that annular flange 92 will be stretched and cammed outwardly just enough to bring the surface of top section 95 of flange 92 into substantially parallel relationship with axis A—A of closure 64 so that the exterior surface of ring 94 will be positioned in face-to-face relationship with the mating surface of top section 95 when the closure is positioned all the way home over the mouth of the vial as illustrated in Fig. 6. This effect can be achieved by making the outside diameter of ring 94 equal to the inside diameter of top section 95 plus twice the distance "C" shown in Fig. 7. As there shown, the distance "C" is the distance that the base of top section 95 is moved inwardly in a horizontal plane away from a line perpendicular to the horizontal plane of the surface of top cover member 68 of closure 64 as a result of tilting flange 92 inwardly towards axis A—A of closure 64. The dotted line position of flange 92 in Fig. 7 illustrates the position of the flange when the closure is all the way home over the mouth of the vial as shown in Fig. 6, at which time the exterior surface of the flange is substantially perpendicular to the horizontal plane of the surface of top cover member 68. In order to provide a lead in section for orienting the closure over the open mouth of the vial and a camming surface for stretching and tilting flange 92 outwardly, the surface of bottom section 96 of flange 92 is tapered outwardly towards the exterior surface of the flange so that the inside diameter of section 96 gradually increases towards rim 97 at the open mouth of closure 64. The inside diameter of section 96 at rim 97 is just a little larger than the outside diameter of annular ring 94, so that the mouth of closure 64 will readily fit over the top portion of the ring.

With this construction if the thickness of the wall of vial 62 were uniform the rim of closure 64 would project out beyond the surface of the side wall of vial 62. In the preferred form of our invention shown in Fig. 6, the thickness of the wall of vial 62 is increased just enough at the place where the rim of annular flange 92 is positioned when closure 64 is fully home over the mouth of the vial so that the outside surface of the side wall of the vial and annular flange are approximately flush. The increase in the thickness of the side wall of vial 62 provides a step or shoulder 98 in the side wall of the vial which is positioned adjacent to rim 97 when the closure is fully home over the mouth of the vial.

As to materials, the materials used in the construction of closure 64 and disk 66 are the same as those used in the structure of the form of our invention shown in Fig. 1 and closure 64 is preferably made of a plastic material that is softer than the vial for which it is intended. When this is done the annular ring 94 on the side wall of the vial tends to bite into the plastic material of the annular flange of the closure, giving a very tight seal when the closure is fully home over the mouth of the vial. For example, we have achieved excellent results by making the disk of the closure and the vial of polystyrene and the remainder of the closure of polyethylene vinyls and like resilient plastic materials. In order to assist in removing closure 64 from the mouth of the vial, a bead 100 may be positioned at the junction between cover member 68 and flange 92 so that the bead projects out beyond the exterior surface of flange 92 to form a grip for removing the closure from the mouth of the vial.

It will be obvious to those skilled in the art that flange 92 may be used in the closure shown in Fig. 1 in place of flange 34, so that the closure of Fig. 1 may be used for sealing a vial of the type shown in Fig. 6.

In the practice of our invention we have found that the plastic materials employed for the closure members described and illustrated in Figs. 1 through 7 must be sufficiently resilient so that the closure may be stripped from the mold without damaging the undercut required for locking grooves 31 and 84. Polyethylene is excellent for this purpose but in many cases it is desirable to have a closure made of rigid plastic materials such as the phenolic resins especially where the closure is to be used with plastic or glass containers for liquid medicaments. In working with this problem we have now devised particularly effective means for rotatively mounting the disk on top of the closure and these mounting means eliminate the requirement for an undercut and at the same time they facilitate rotation of the disk by hand and give the required control of frictional drag so that the disk will not be accidentally rotated away from the hour at which it is set.

The structure of this form of our invention is shown in Figs. 8 through 11. As there shown, 102 is the closure as it appears in position over the mouth of a container 104. Closure 102 includes a disk 106 that is rotatively mounted on top of cover member 108. The diameter of disk 106 is smaller than the diameter of cover member 108 and the disk carries an indicator 110 for recording time. Construction of indicator 110 is identical with that of the indicator shown in Fig. 2 and disk 106 is surrounded with numerals from 1 to 12 positioned on top cover member 108 in a circle around the disk. The numerals cooperate with indicator 110 for maintaining a record of the time.

The mounting means for disk 106 include a circular depression 112 with diameter slightly greater than that of the disk and the depth of the depression is such that the top surface of the disk is held approximately flush with the top surface of cover member 108 as shown in the drawings. Disk 106 is free to rotate in depression 112 without binding against the wall thereof, and since the clearance between the wall of the depression and periphery of the disk is small the side edge of the disk is protected by the wall of the depression which guards against accidentally hitting the disk and rotating it away from the position at which it is set.

As in the case of the form of our invention shown in Fig. 3, disk 106 is rotatively locked in place in cover member 108 by means of a stub shaft 114 which carries a small protuberance such as annular ring 116 which makes a so-called snap-in fit with a circular opening 118 positioned in the center of depression 112 of top cover member 108. It will be noted that there is no groove undercut in the wall of opening 118 and the wall of the opening is perfectly smooth. Locking is achieved by making stub shaft 114 long enough so that the annular ring 116 will project beyond the rim at the bottom of opening 118 and overlap and bear against the bottom surface of cover member 108 within an opening 119 positioned in the bottom of cover member 108. The inside diameter of opening 119 is of course greater than the outside diameter of annular ring 116. The inside diameter of opening 118 is preferably made slightly smaller than the outside diameter of the wall of stub shaft 114 so that the stub shaft makes a so-called interference fit with the wall of opening 118, that is, friction will be generated when disk 106 is rotated.

Figures 9, 11, 12:
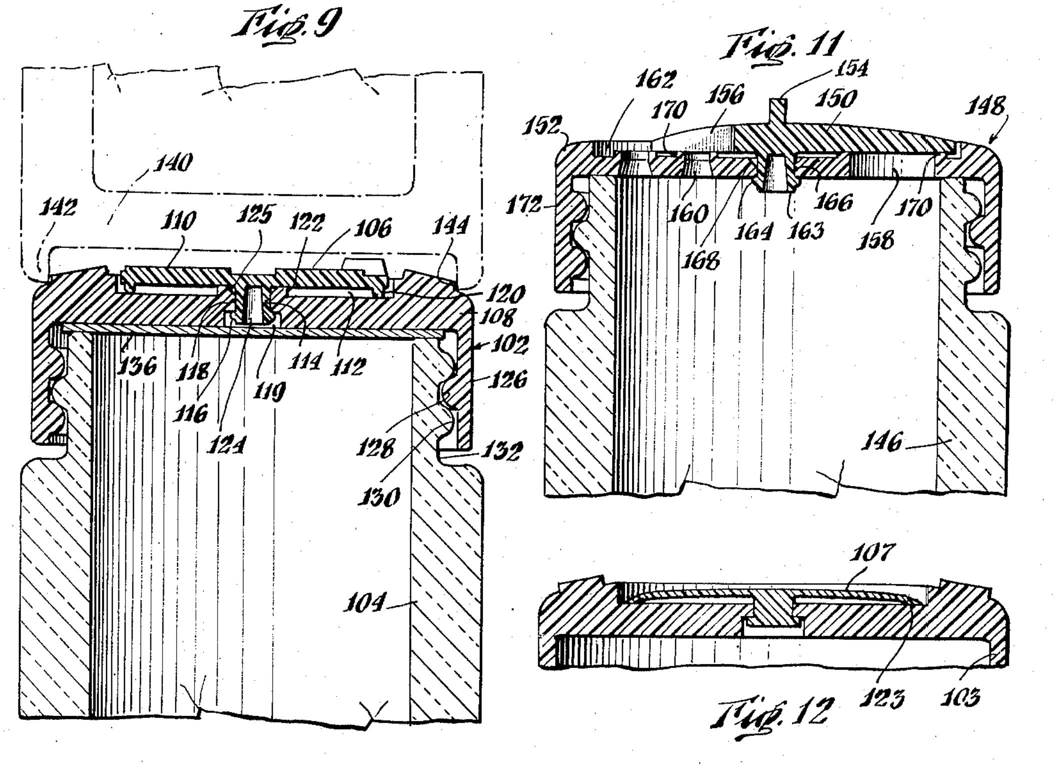
Fig. 9 is a sectional view of the closure of Fig. 8 taken in line 9—9 of Fig. 8 to show the closure in position over the open mouth of a container.
Fig. 11 is a sectional view of the dispenser closure of Fig. 10 taken on line 11—11 of Fig. 10.
Fig. 12 is a fragmentary view of the closure of Fig. 9 illustrating an alternate way of controlling friction between the moving parts of the closure.

As in the forms of our invention shown in Figs. 1 through 7, frictional drag between the disk and the surface at the bottom of depression 112 is controlled by means of one or more annular bearing surfaces such as 120 and 122 respectively which separate the surface of disk 106 from the surface of the bottom of depression 112. Preferably a major portion of the bottom surface of the disk is separated from the bottom of the depression. Either of the bearing surfaces 120 and 122 respectively may be used alone or in combination with each other and as in the form of our invention illustrated in Fig. 3 such bearing surfaces so reduce frictional resistance to rotation between disk 106 and the surface of depression 112 that the disk may be readily turned by hand, and at the same time the frictional drag between the wall of stub shaft 114 and opening 118 is enough to hold the disk in a set position so that there is no tendency for it to jiggle out of place when the closure is removed from the container in use. Referring to Fig. 9, it will be seen that bearing surface 120 is in the form of an annular ring or rail that projects down below the surface of disk 106 adjacent the periphery thereof while bearing surface 122 is an annular bearing surface that projects up above the level of the bottom of circular depression 112 adjacent the periphery of opening 118. It is obvious that bearing surface 120 can be positioned in the circular depression or bearing surface 122 can be positioned on stub shaft 114 with the same results and bearing surface 120 or bearing surface 122 may be used alone as illustrated in Figs. 3 and 4 respectively or the bearing surfaces may be used in combination as shown in Fig. 9.

Further it will be obvious to those experienced in the field that the bearing surface for controlling friction and for separating the surface of the rotating disk from the closure of our invention may be constructed in a number of different ways. For example, the disk itself may be bent so that only a part of the surface of the disk is in contact with the surface of the closure. This is illustrated in Fig. 12. As there shown disk 107 is slightly bent so that it bows up in the middle and as a result the surface at the periphery of the disk which is in contact with closure 103 serves as a bearing surface 123 for controlling friction between the disk and closure.

As in the case of the form of our invention shown in Fig. 3, in order to snap annular ring 116 through opening 118 in top cover member 108, it is necessary to make one of these members sufficiently resilient so that the resilient member will distort enough to allow the ring to pass through the opening and thereafter snap back in place to lock the stub shaft in rotative position in cover member 108. For best results we prefer to make the entire closure of plastic materials. In those cases where a resilient plastic material such as polyethylene is selected for cover member 108, then the disk and stub shaft can be made of a rigid plastic such as styrene. However, for containers for liquids, we prefer to make the cover member of a rigid plastic material such as phenolic urea or styrene plastic materials and in such case the disk and stub shaft are preferably made with a plastic material having greater resiliency than that of the cover member. But the disk cannot be so flexible that it loses its shape in use and a plastic material as flexible as polyethylene is unsatisfactory. We have achieved excellent results with a phenolic cover member and a disk made of cellulose acetate. The actate disk has greater resiliency than the phenolic cover member so that the annular ring on the stub shaft may be readily snapped into place in the cover member of the closure and yet the acetate disk is strong enough to maintain its shape in use. Best results have been achieved by making stub shaft 114 hollow as indicated at 124 in the drawings and this so increases the resiliency of the stub shaft that if desired the stub shaft and disk may be made of the same rigid plastic material as the cover member since the hollow stub shaft will give enough to allow the annular ring to pass through opening 118 and the rigid plastic materials are sufficiently resilient to snap annular ring 116 back in place against the bottom of cover member 108. In order to assist passing annular ring 116 through opening 118 the top of the wall of the opening is beveled as at 125 and the beveled edge serves as a cam for leading the annular ring into opening 118.

Referring again to top cover member 108, it will be seen that the cover member carries an annular flange 126 provided with screw threads 128 that mate with corresponding threads 130 positioned on the exterior around the open mouth of container 104. The exterior side wall of the container is stepped-in as at 132 so that the exterior surface of flange 126 and the exterior surface of the container will be approximately flush. In order to provide a tight liquid seal with the rim of container 104 we provide a circular gasket 136 that is affixed in the bottom of the closure. In this connection it will be noted that opening 119 in the bottom surface of cover member 108 is deep enough to leave clearance between gasket 136 and stub shaft 114 so that the gasket does not interfere with rotation of disk 106.

Referring to the container, in some cases particularly where the container is made of plastic materials the base 140 of the container is recessed leaving an annular flange 142 projecting down around the periphery of the base of the container and in such case we prefer to cut an annular notch 144 around the rim of top cover member 108 adapted to receive annular flange 142 which greatly expedites stacking the closed containers for shipment.

Figure 8:
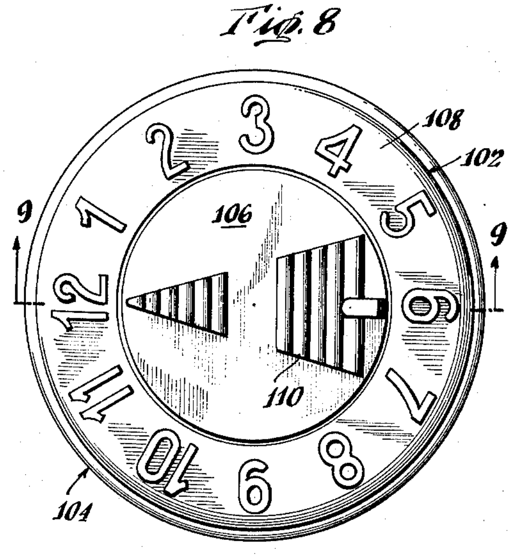
Fig. 8 is a top view of another form of the closure of Fig. 1.
Figure 10:
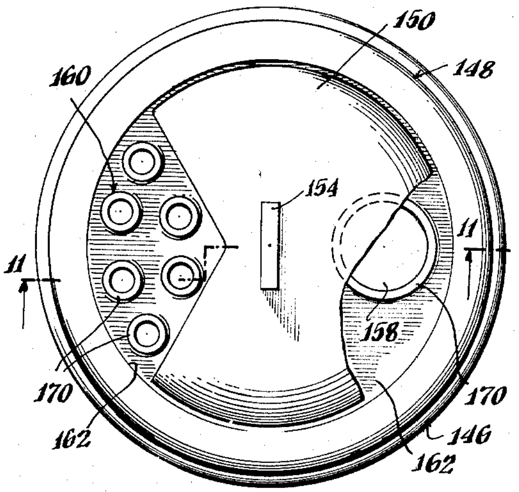
Fig. 10 is a top view of another form of the dispenser closure of Fig. 5.

The form of our invention shown in Figs. 8 and 9 may also be adapted for use as a dispenser for condiments and the like and this form of our invention is illustrated in Figs. 10 and 11. As there shown the dispenser includes a screw top container 146 and a closure 148 for closing the open container. Closure 148 includes a disk 150 rotatively mounted on the top cover member 152 of closure 148 and the diameter of the disk is smaller than the diameter of the top cover member. Disk 150 has a flange 154 that projects up above the surface at the center of the disk to provide means for rotating the disk and the disk also includes a V-shaped slot 156 identical with the one described in connection with Figs. 5 and 6 of the drawings which cooperates with an opening 158 and a perforated section 160 positioned in the circular depression 162 of cover member 152 for dispensing condiments.

As in the case of the form of our invention illustrated in Fig. 9, disk 150 has a stub shaft 163 which is preferably hollow as shown and the stub shaft carries an annular ring 164 that projects out from the wall of the shaft for rotatively locking the disk in position in circular depression 162 of cover member 152. For this purpose a circular opening 166 is positioned in the center of depression 162 and the construction and functioning of stub shaft 160 and opening 166 is identical with opening 118 and stub shaft 114 of Fig. 9. It will be noted, however, that in this form of our invention there is no gasket and this eliminates the need for an opening such as opening 119 in Fig. 9 which protects the stub shaft so that it is free to rotate independently of the gasket. The top of the wall of opening 166 has a bevelled edge 168 for camming annular ring 164 through opening 166.

In this form of our invention frictional drag between disk 150 and the surface at the bottom of depression 162 is controlled by the annular bearing surfaces 170 positioned around the periphery of each hole in the perforated section 160 and around the periphery of opening 158. Annular bearing surfaces 170 project up above the surface of the bottom of circular depression 162 so that a major portion of the bottom surface of the disk is separated from the bottom of depression 162 for the control of friction as previously described hereinabove. In this case bearing surfaces 170 have a secondary function in that they provide an individual seal around opening 158 and an individual seal for each hole in perforated section 160. As previously described, the circumference of circular depression 162 is slightly larger than the circumference of disk 150 and the depth of the depression is such that the top surface of the disk is held approximately flush with the top surface of cover member 152 as shown in the drawings. Top cover member 152 has an annular flange 172 which projects down from the periphery of the cover member and the interior of flange 172 is provided with screw threads adapted to mate with threads of the screw top of container 146 for closing the container. The materials employed on the construction of this form of our invention are identical with those described in connection with the form of our invention illustrated in Figs. 8 and 9 and any of the known thermoplastic or thermosetting plastic materials may be employed provided the disk is made stiff enough so that it will retain its shape in use.

It will be understood that we intend to cover all changes and modifications of the preferred embodiment of our invention herein chosen for the purpose of illustration which do not constitute departures from the spirit and scope of our invention.

What we claim is:

1. A closure for vial or similar article which comprises a top cover member having an annular flange that projects down below the cover member for closing the vial, a disk with smaller diameter than that of the cover member, a circular depression positioned in the top surface of said cover member adapted to receive the disk, means for rotatively mounting the disk in said circular depression, an annular bearing surface which separates the bottom of the disk from the surface of the bottom of the circular depression so that the area of the contacting surfaces between the disk and circular depression is reduced to reduce friction caused by rotating the disk whereby the disk may be readily turned to any desired position relative to the cover member and in which the said mounting means includes a stub shaft mounted on the bottom of said disk with an annular locking ring positioned on the stub shaft that projects out beyond the wall of the shaft, a boss with a socket therein positioned at the bottom of the circular depression, said socket having an annular groove formed in the side wall thereof, said socket and groove being adapted to receive and rotatively hold the stub shaft with the annular ring of the stub shaft locked in position in the groove of the socket, and said boss being made of plastic material that has greater resiliency than the material of the stub shaft whereby the stub shaft may be snapped into the said groove and rotatively locked therein.

2. A structure as specified in claim 1 in which the annular bearing surface is positioned on the bottom surface of the disk.

3. A structure as specified in claim 1 in which the annular bearing surface is positioned on the surface of the circular depression where it projects up above the level of such surface.

4. A structure as specified in claim 1 which includes numerals from 1 to 12 positioned on top of said top cover member in a circle around the disk and which includes an indicator positioned on top of the disk which cooperates with the numerals so that the disk may be set to the desired hour to maintain a record thereof.

5. A structure as specified in claim 1 in which the annular flange of the closure tapers inwardly towards the vertical axis through said closure and in which the inside surface of said flange is divided into two sections, a top section the surface of which is positioned parallel to the exterior surface of the flange and a bottom section which tapers out towards the exterior surface of said flange.

6. A structure as specified in claim 1 in which the bearing surface is formed by bending the disk so that only a portion of the bottom surface of the disk is in contact with the surface at the bottom of the circular depression.

7. A closure for vial or similar article which comprises a top cover member of plastic material having an annular flange that projects down below the cover member for closing the vial, a disk with smaller diameter than that of the cover member, a circular depression positioned in the top surface of said cover member adapted to receive the disk, means for rotatively mounting the disk in said circular depression, including a stub shaft of plastic material mounted on the bottom of said disk which is rotatively mounted in an opening positioned in said depression, said opening having its diameter approximately equal to the outside diameter of said stub shaft so that friction is generated when the disk is rotated whereby the disk may be readily rotated and set in any desired position relative to the cover member, an annular locking ring projecting out from the wall of the stub shaft positioned where it overlaps the rim at the bottom of the wall of the opening for locking the shaft in position in such opening said locking ring on the stub shaft having a greater outside diameter than the inside diameter of the opening in the cover member and said cover member and stub shaft each having a different degree of resiliency whereby one of these will yield to allow the locking ring to pass through the opening and snap into place overlapping the rim of the wall at the bottom of the opening to lock the disk in rotative position in the circular depression of the cover member.

8. A structure as specified in claim 7 in which the plastic material of the stub shaft has greater resiliency than the plastic material of the cover member whereby the plastic material of the stub shaft will yield and allow the locking ring to pass through the opening in the cover member.

9. A structure as specified in claim 7 in which a gasket member is positioned in the cover member below the stub shaft which forms a seal in said cover member separating the stub shaft from the contents of the vial.

10. A structure as specified in claim 7 in which the distance along the stub shaft between the disk and locking ring is less than the depth of the opening in the top cover member whereby the resilient plastic material of the wall of the opening of the cover member will be slightly compressed to exert positive tension outwardly against the disk and locking ring for holding the stub shaft in position in the cover member.

11. A structure as specified in claim 7 in which the distance along the stub shaft between the disk and locking ring is less than the depth of the opening in the top cover member and in which the plastic material of the stub shaft has greater resiliency than the plastic material of the cover member whereby the plastic material of the stub shaft will be slightly stretched and maintained under tension when it is in position in the opening of the top cover member.

12. A structure as specified in claim 7 in which the stub shaft and cover member are made of the same plastic material and in which the stub shaft is hollow so that it will yield and allow the locking ring to pass through the opening in the cover member.

13. A structure as specified in claim 7 in which the cover member is made of a plastic material having greater resiliency than the plastic material of the stub shaft so that the cover member will yield to allow the locking ring to pass through the opening and snap into place overlapping the rim of the wall at the bottom of the opening.

14. A structure as specified in claim 7 in which the disk has a portion cut away and in which the cover member includes perforations so that the perforations in the cover member may be uncovered by rotating the disk.

15. A structure as specified in claim 7 in which the cover member is provided with an integral portion which extends across below the bottom of said stub shaft for closing the opening in the cover member so that the contents of the vial will be separated from said stub shaft.

References Cited in the file of this patent

UNITED STATES PATENTS

| | | |
|---|---|---|
| 1,260,546 | Jenkins | Mar. 26, 1918 |
| 2,526,397 | Nyden | Oct. 17, 1950 |
| 2,569,162 | Gowland | Sept. 25, 1951 |